US012712227B2

(12) United States Patent
Lee et al.

(10) Patent No.: US 12,712,227 B2
(45) Date of Patent: Aug. 18, 2026

(54) POUCH-SHAPED BATTERY SEALING APPARATUS INCLUDING POSITION ADJUSTMENT UNIT AND POUCH-SHAPED BATTERY SEALING METHOD USING THE SAME

(71) Applicant: LG ENERGY SOLUTION, LTD., Seoul (KR)

(72) Inventors: Jae Ho Lee, Daejeon (KR); Yong Su Choi, Daejeon (KR); Sang Hun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 698 days.

(21) Appl. No.: 17/926,266

(22) PCT Filed: Nov. 24, 2021

(86) PCT No.: PCT/KR2021/017416
§ 371 (c)(1),
(2) Date: Nov. 18, 2022

(87) PCT Pub. No.: WO2022/119226
PCT Pub. Date: Jun. 9, 2022

(65) Prior Publication Data

US 2023/0207935 A1 Jun. 29, 2023

(30) Foreign Application Priority Data

Dec. 1, 2020 (KR) ........................ 10-2020-0165644

(51) Int. Cl.
*H01M 50/186* (2021.01)
*H01M 10/04* (2006.01)
(Continued)

(52) U.S. Cl.
CPC ..... *H01M 50/186* (2021.01); *H01M 10/0404* (2013.01); *H01M 10/48* (2013.01); *H01M 50/105* (2021.01); *H01M 50/531* (2021.01)

(58) Field of Classification Search
CPC ........... H01M 50/186; H01M 10/0404; H01M 10/48; H01M 50/105; H01M 50/531;
(Continued)

(56) References Cited

U.S. PATENT DOCUMENTS

2002/0157242 A1* 10/2002 Fukuda .................. B29C 65/18 29/730
2018/0047950 A1* 2/2018 Lim .................... H01M 50/183
(Continued)

FOREIGN PATENT DOCUMENTS

CN 203690351 U 7/2014
CN 107408720 A 11/2017
(Continued)

OTHER PUBLICATIONS

Extended European Search Report including Written Opinion for Application No. 21900914.9 dated Jul. 9, 2024, pp. 1-9.
(Continued)

*Primary Examiner* — Matthew T Martin
*Assistant Examiner* — Bartholomew A Hornsby
(74) *Attorney, Agent, or Firm* — Lerner David LLP

(57) ABSTRACT

The present invention relates to a pouch-shaped battery sealing apparatus including a position adjustment unit capable of adjusting relative positions of an electrode lead and an insulative film before sealing during a process of applying heat and pressure to an outer periphery of a battery case made of a laminate sheet to seal the outer periphery of the battery case when a pouch-shaped battery is manufactured and a pouch-shaped battery sealing method using the same.

18 Claims, 7 Drawing Sheets

(51) Int. Cl.

| | |
|---|---|
| ***H01M 10/48*** | (2006.01) |
| ***H01M 50/105*** | (2021.01) |
| ***H01M 50/531*** | (2021.01) |

(58) Field of Classification Search

CPC .. H01M 50/178; H01M 50/55; H01M 50/557; H01M 50/543; H01M 50/116; H01M 50/172; H01M 50/183

See application file for complete search history.

(56) References Cited

U.S. PATENT DOCUMENTS

| | | | |
|---|---|---|---|
| 2020/0153030 | A1 | 5/2020 | Bae et al. |
| 2022/0166096 | A1 | 5/2022 | Jung et al. |

FOREIGN PATENT DOCUMENTS

| | | | | | |
|---|---|---|---|---|---|
| CN | 108199084 | A | | 6/2018 | |
| CN | 111029636 | A | * | 4/2020 | .......... H01M 10/058 |
| CN | 211295299 | U | | 8/2020 | |
| EP | 3249732 | A1 | | 11/2017 | |
| JP | 2006040747 | A | | 2/2006 | |
| JP | 2018-511912 | A | | 4/2018 | |
| JP | 2020-092062 | A | | 6/2020 | |
| KR | 20120038695 | A | | 4/2012 | |
| KR | 20160118931 | A | | 10/2016 | |
| KR | 20170046910 | A | * | 5/2017 | ........ H01M 10/0404 |
| KR | 101762807 | B1 | * | 7/2017 | ........ H01M 10/0481 |
| KR | 20200053783 | A | | 5/2020 | |
| KR | 20200114410 | A | | 10/2020 | |
| WO | 2020197341 | A1 | | 10/2020 | |

OTHER PUBLICATIONS

International Search Report for Application No. PCT/KR2021/017416 mailed Mar. 3, 2022, 2 pages.

Search Report dated Apr. 23, 2025 from the Office Action for Chinese Application No. 202180035815.1 issued Apr. 27, 2025, pp. 1-2.

* cited by examiner

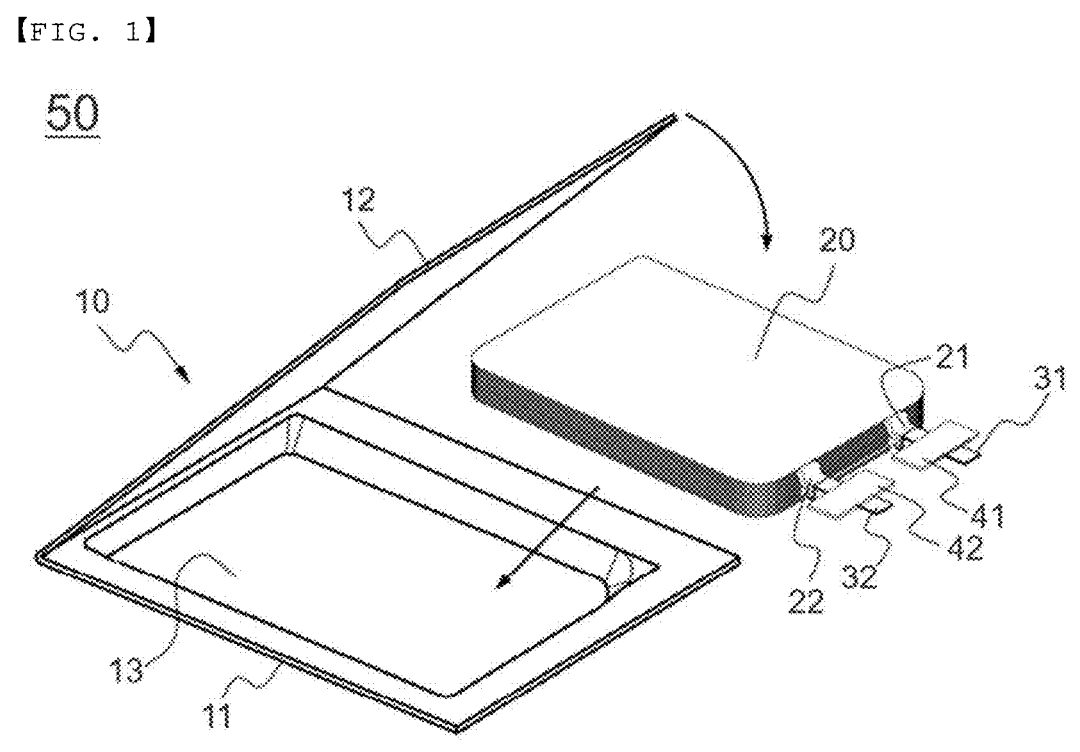

【FIG. 1】

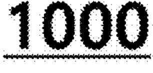
【FIG. 2】
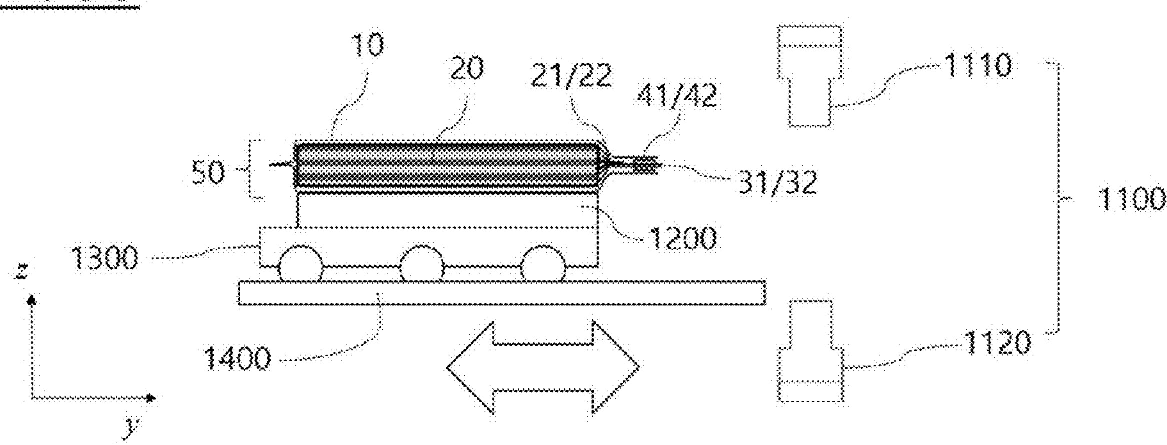
1000
10
20
21/22
41/42
50
31/32
1110
1100
1200
1300
1400
1120
z
y 【FIG. 3】
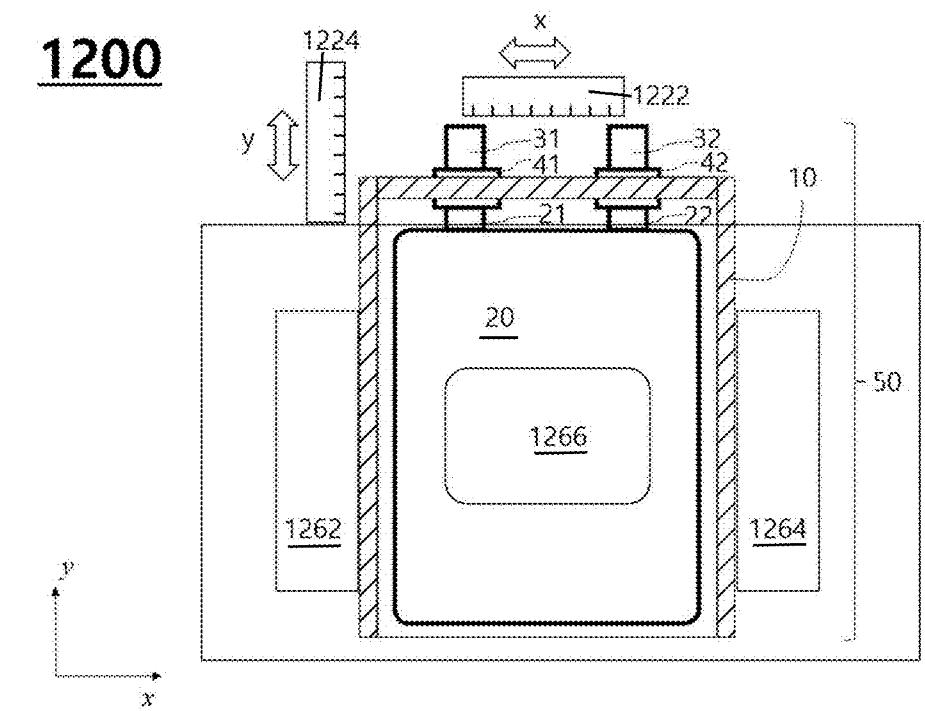
【FIG. 4】
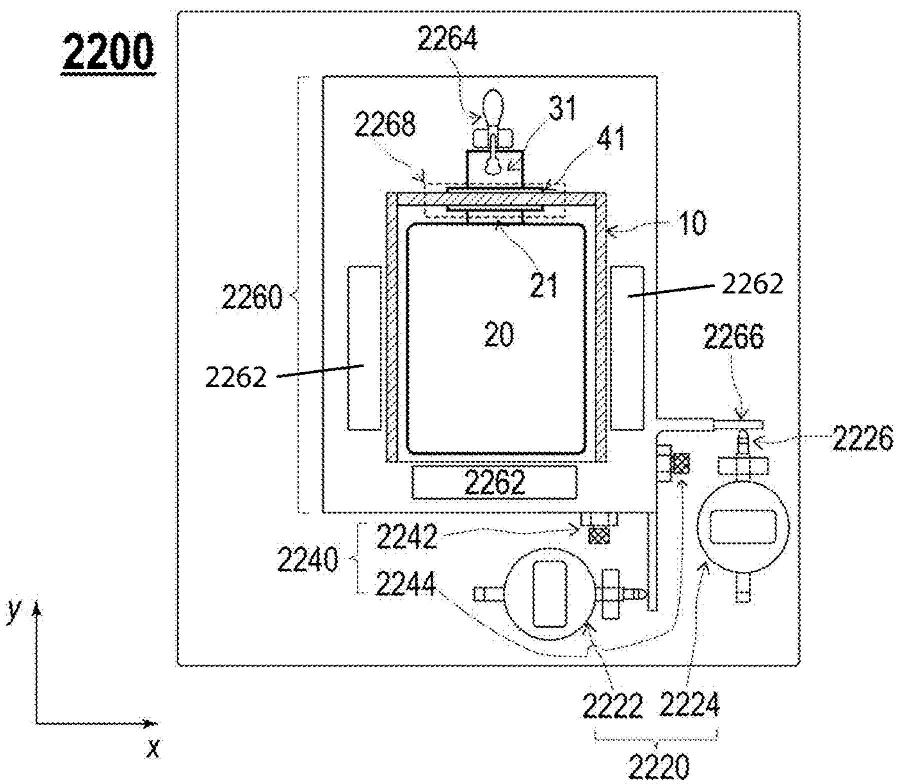

【FIG. 5】
3200
3220
3222 3224
3244
3242
3240
C
31
3226
3266
3268
3264
3262
3262
3262
3260
10
41
21
20
y
x
C
3246
31
3248
【FIG. 6】
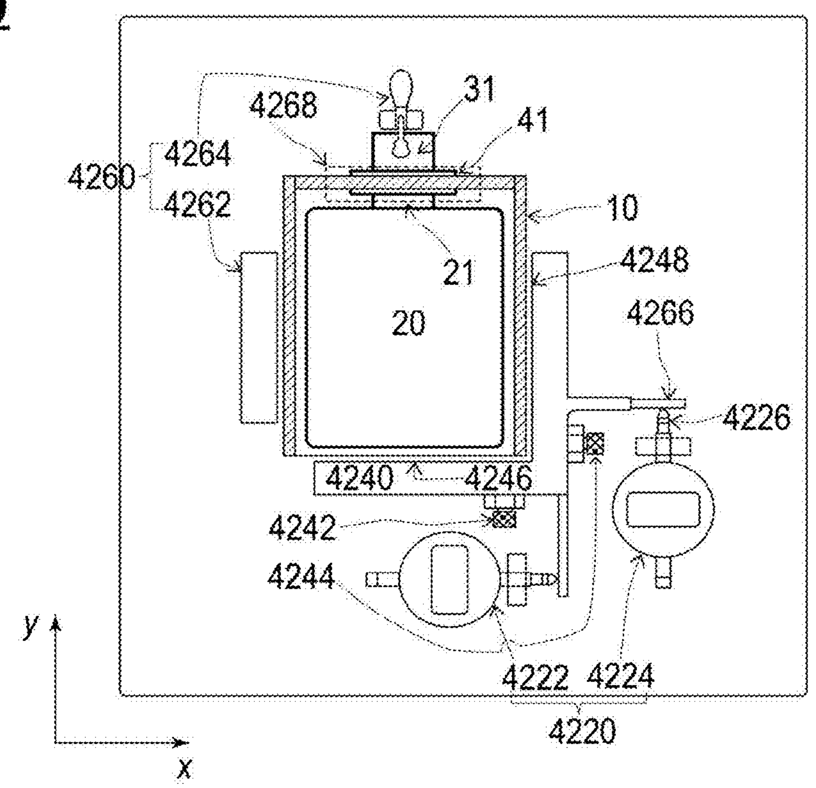

【FIG. 7】
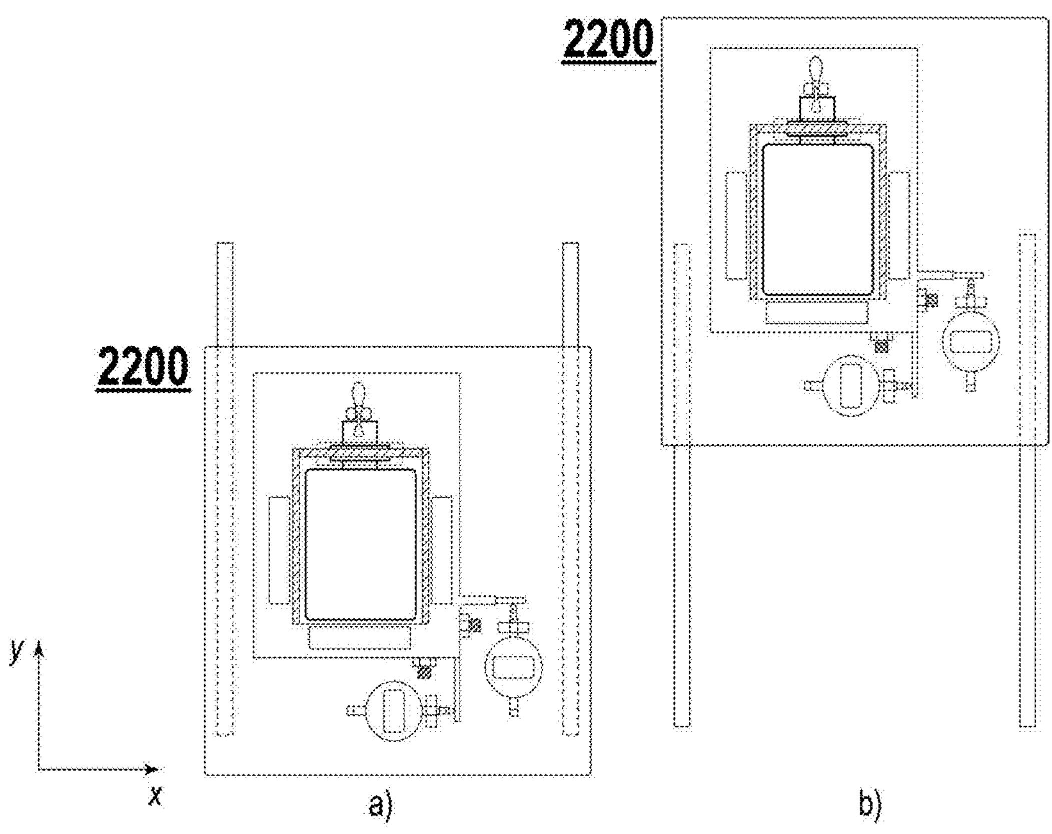
【FIG. 8】
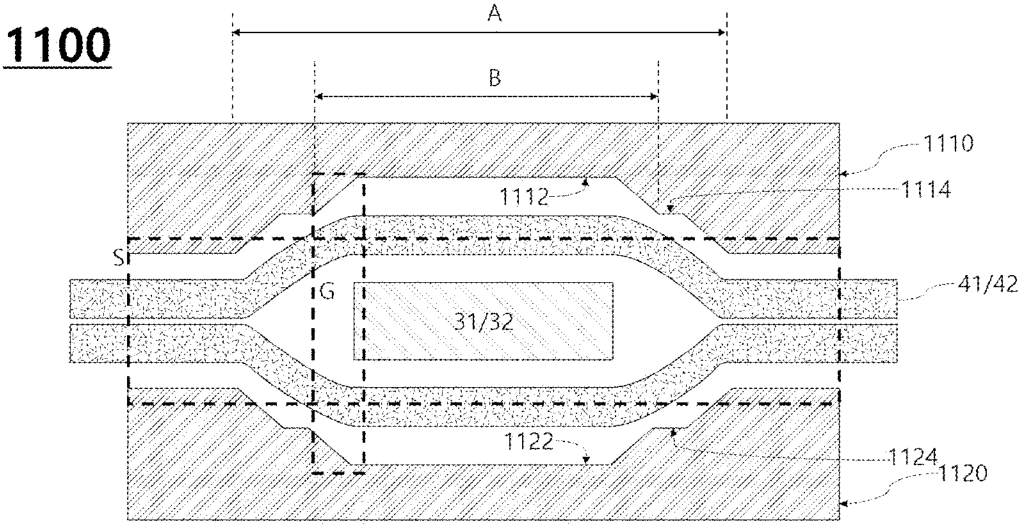

【FIG. 9】
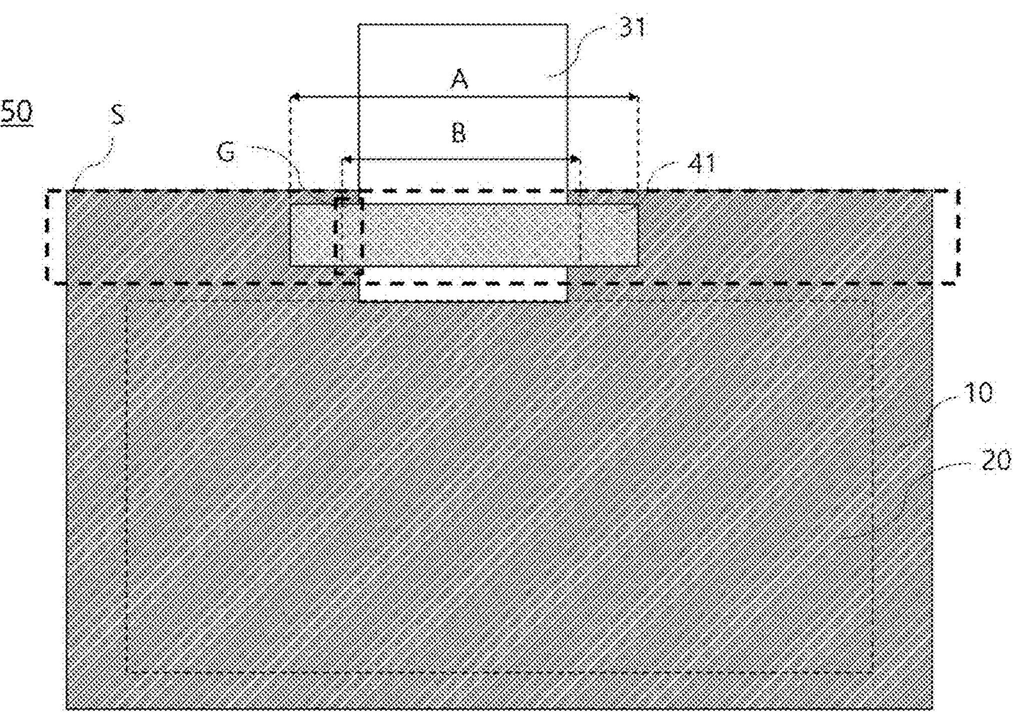
【FIG. 10】
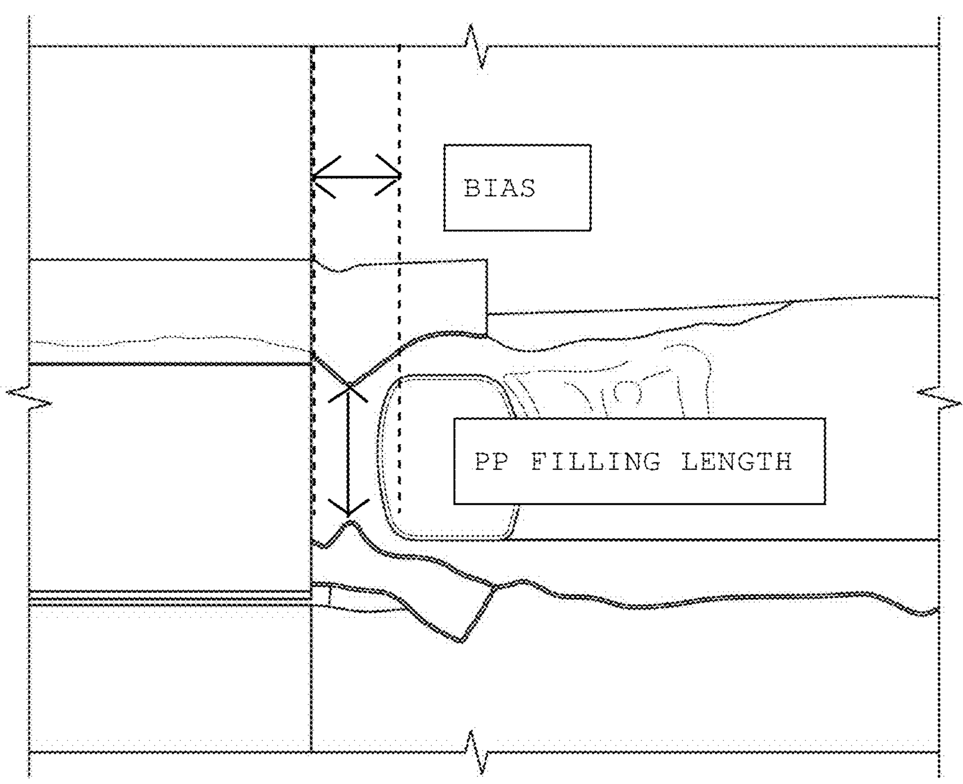

【FIG. 11】
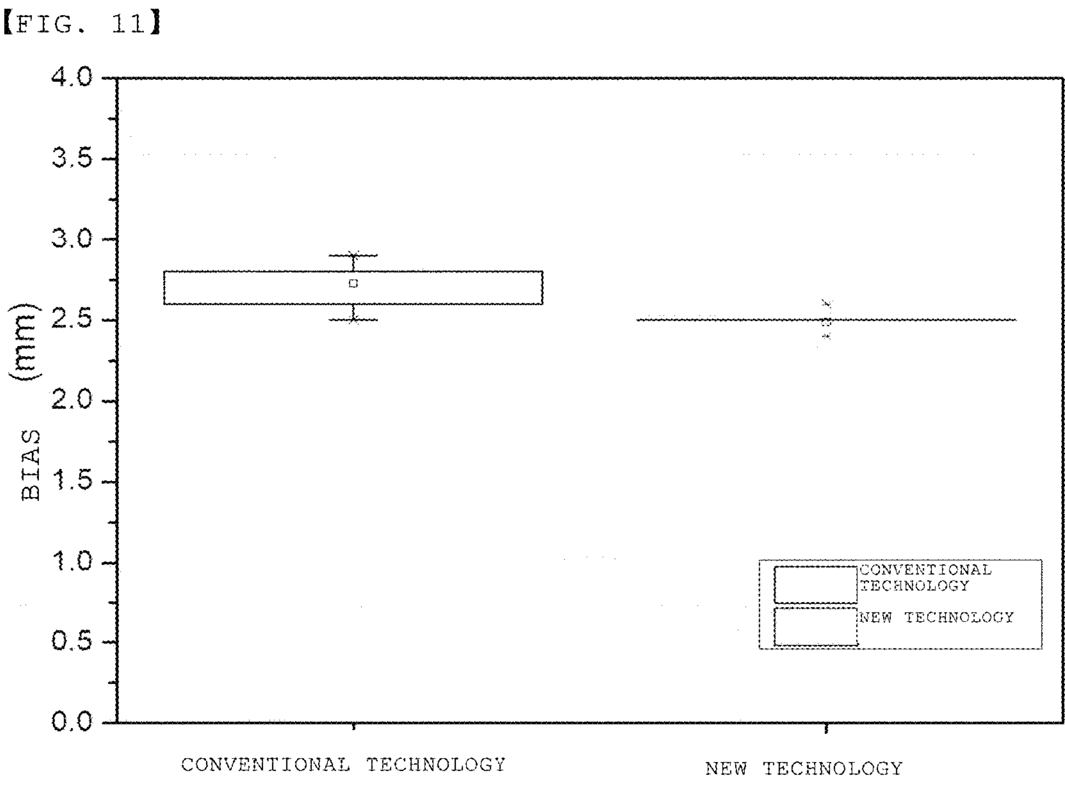
【FIG.12】
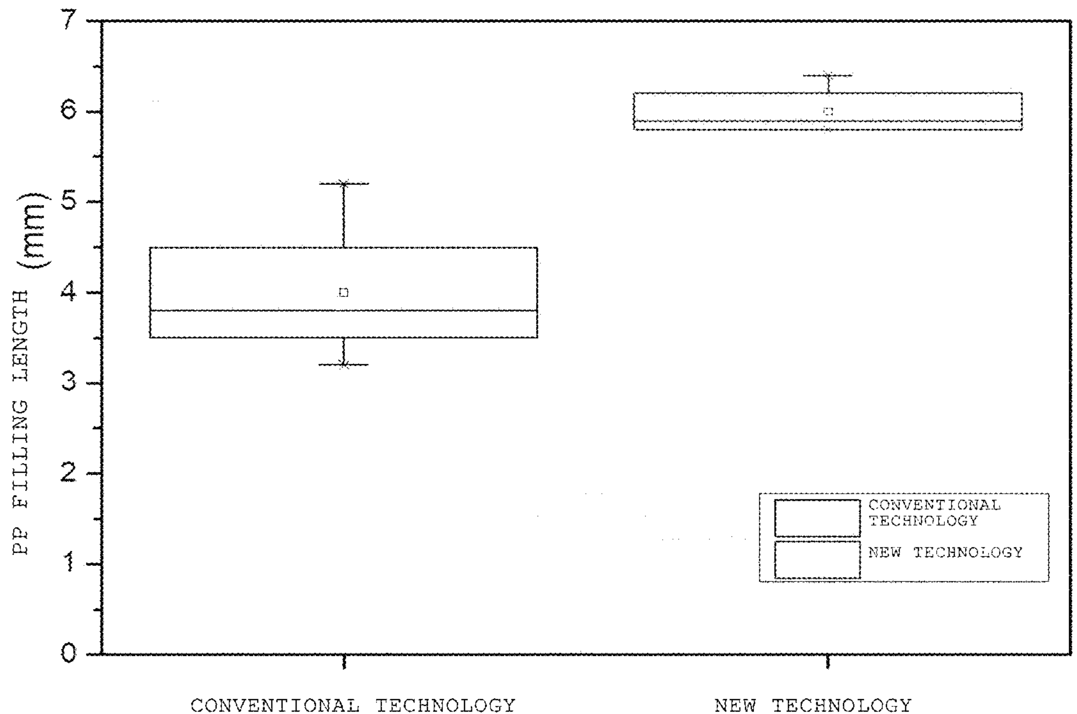

POUCH-SHAPED BATTERY SEALING APPARATUS INCLUDING POSITION ADJUSTMENT UNIT AND POUCH-SHAPED BATTERY SEALING METHOD USING THE SAME

CROSS-REFERENCE TO RELATED APPLICATIONS

This application is a national stage entry under 35 U.S.C. § 371 of International Application No. PCT/KR2021/017416, filed on Nov. 24, 2021, which claims priority to Korean Patent Application No. 10-2020-0165644, filed on Dec. 1, 2020, the disclosures of which are hereby incorporated herein by reference in their entireties.

TECHNICAL FIELD

The present invention relates to a pouch-shaped battery sealing apparatus including a position adjustment unit and a pouch-shaped battery sealing method using the same. More particularly, the present invention relates to a pouch-shaped battery sealing apparatus including a position adjustment unit capable of adjusting the position of a lead at a battery case made of a laminate sheet during a process of applying heat and pressure to an outer periphery of the battery case to seal the outer periphery of the battery case when a pouch-shaped battery is manufactured and a pouch-shaped battery sealing method using the same.

BACKGROUND ART

Demand for a secondary battery as an energy source for mobile devices, electric vehicles, etc. has abruptly increased. In particular, demand for a lithium secondary battery, which has high energy density and high discharge voltage, is high.

Based on the shape and material thereof, the lithium secondary battery may be classified as a cylindrical secondary battery made of a metal material, a prismatic secondary battery made of a metal material, or a pouch-shaped battery made of a laminate sheet. The pouch-shaped battery has advantages in that the pouch-shaped secondary battery is stacked with high integrity, thereby having high energy density per unit weight, is manufactured at low cost, and is easily deformable. Consequently, the pouch-shaped battery is used in various devices.

In general a laminate sheet including an outer coating layer, a metal blocking layer, and an inner adhesive layer is shaped so as to be used as a battery case of the pouch-shaped battery. An electrode assembly is received in a receiving portion formed in the laminate sheet together with an electrolytic solution, and the receiving portion is sealed, whereby the pouch-shaped battery is manufactured.

As shown in FIG. 1, a pouch-shaped battery is configured such that an electrode assembly 20 is mounted in a receiving portion 13 of a battery case 10 constituted by a lower pouch-shaped part 11 and an upper pouch-shaped part 12. In the electrode assembly 20, positive and negative electrode tabs 21 and 22 are exposed outside of the battery case 10 in a state of being welded respectively to two electrode leads 31 and 32. An outer periphery of the battery case 10 is sealed in the state in which a pair of insulative films 41 and a pair of insulative films 42 are disposed respectively at an upper part and a lower part of the electrode lead 31 and an upper part and a lower part of the electrode lead 32.

The outer periphery of the battery case 10 is sealed as the result of inner adhesive layers of laminate sheets being thermally melted and pressed by a rectangular parallelepiped sealing tool that is long in a longitudinal direction thereof.

FIG. 2 is a side view of a conventional pouch-shaped battery sealing apparatus 1000, and FIG. 3 is a top view of a position adjustment unit 1200 of the conventional pouch-shaped battery sealing apparatus 1000.

The conventional pouch-shaped battery sealing apparatus 1000 includes a sealing block 1100 including an upper sealing block 1110 and a lower sealing block 1120, a position adjustment unit 1200 configured to allow the pouch-shaped battery 50 to be located thereon or therein, the position adjustment unit being configured to adjust the position of the pouch-shaped battery 50 relative to the sealing block 1100, and a delivery unit 1300 configured to assist in moving the entirety of the position adjustment unit 1200. The delivery unit 1300 is located on a base 1400.

In the conventional pouch-shaped battery sealing apparatus 1000, the pouch-shaped battery 50 is disposed on or in the position adjustment unit 1200. In order to accurately seal the pouch-shaped battery 50, the position of the pouch-shaped battery 50 is measured using a position measurement unit 1220, and the displacement of the pouch-shaped battery is also measured using the position measurement unit. The position measurement unit 1220 includes a ruler 1222 configured to measure the horizontal displacement of the pouch-shaped battery and a ruler 1224 configured to measure the vertical displacement of the pouch-shaped battery. Here, adjusting the position of the pouch-shaped battery 50 entails adjusting x-axis, y-axis, and z-axis positions of the electrode leads 31 and 32 and the insulative films 41 and 42 of the pouch-shaped battery 50, preferably x-axis and y-axis positions of the electrode leads and the insulative films of the pouch-shaped battery, which are leftward-rightward positions excluding an upward-downward position, thereby setting the position of the pouch-shaped battery relative to the sealing block 1100.

In FIG. 3, a hatched portion of the battery case 10 of the pouch-shaped battery 50 is a portion to be sealed. For left and right sealed portions, abutting parts of the battery case 10 are sealed, whereby detailed adjustment in position thereof is not necessary or is not greatly important. For an upper sealed portion, at which the electrode leads 31 and 32 and the insulative films 41 and 42 are located, a sealing difference depending on position is great. If no grooves are provided in the sealing block, adjustment in position is not necessary.

As will be described with reference to FIG. 5, in the present invention, grooves are provided in the upper sealing block 1110 and the lower sealing block 1120 of the sealing block 1100 in order to improve sealing at projecting portions of the electrode leads 31 and 32 and the insulative films 41 and 42. First grooves 1114 and 1124 and second grooves 1112 and 1122 corresponding to the electrode leads 31 and 32 and the insulative films 41 and 42 are provided in the sealing block 1100.

The x-axis, y-axis, and z-axis positions of the electrode leads 31 and 32 and the insulative films 41 and 42 are adjusted in order to adjust the positions of the electrode leads and the insulative films relative to the first grooves 1114 and 1124 and the second grooves 1112 and 1122. Adjusting the position of the pouch-shaped battery 50 after locating the pouch-shaped battery 50 in the sealing block 1100 is not easy due to spatial limitations. Consequently, position adjustment is performed in the separate position adjustment unit 1200, and the entirety of the position adjustment unit 1200 is translated by the delivery unit 1300. The pouch-shaped battery 50, the position of which has been adjusted, is located between the sealing block 1100 by the delivery unit 1300. When the pouch-shaped battery 50 is transferred by the delivery unit 1300 or is sealed by the sealing block 1100, side surfaces and an upper surface of the pouch-shaped battery 50 are fixed by a fixing unit 1260 such that the pouch-shaped battery 50 cannot move. The fixing unit 1260 shown in FIG. 3 by way of example is constituted by side walls 1262 and 1264 configured to fix the side surfaces of the pouch-shaped battery and a pressing member 1266 configured to fix the upper surface of the pouch-shaped battery.

The conventional pouch-shaped battery sealing apparatus 1000 has a problem in that, during a process of adjusting the position of the pouch-shaped battery 50, it is not possible to accurately move the pouch-shaped battery by a desired distance and it is also not possible to accurately measure the displacement of the pouch-shaped battery. In particular, for the lead of the pouch-shaped battery, sealing always becomes a problem due to the metal material and thickness thereof. It is difficult to acquire accurate information about sealing strength depending on the position and kind of the lead. As a result, whenever processing conditions are changed, a worker sets the position of the lead and tolerance therefor based on inaccurate criteria, e.g. their experiences. In addition, for measurement thereof, the displacement of the pouch-shaped battery is measured using the rulers 1222 and 1224. In this case, accuracy is very low, and many errors occur.

When a sealing apparatus including a stepped portion configured to prevent an electrolytic solution leakage phenomenon, as in a pouch-shaped battery sealing apparatus according to Patent Document 1, is used, there is a much higher necessity for disposing electrode leads of the pouch-shaped battery at exact positions. Patent Document 1 lacks a detailed solution thereto.

Patent Document 2 mentions a pressing jig control unit configured to equally fasten battery cells, wherein the control unit is moved in an upward-downward direction, and a means capable of accurately moving various-sized pouch-shaped batteries in all directions is not disclosed.

Great difference in sealing strength occurs depending on the positions of the electrode leads 31 and 32 and the insulative films 41 and 42 relative to the sealing block 1100. Since sealing strength is greatly changed even due to a displacement of a few microns, the electrode leads 31 and 32 and the insulative films 41 and 42 must be disposed at exact positions, and, in addition, setting an error range allowable in a process is very important.

Sealing strength may vary depending on the kind and thickness of the metal of the metal blocking layer of the laminate sheet, the thickness and adhesive component of the inner adhesive layer of the laminate sheet, the kind and thickness of the metal of the electrode lead, the thickness and constituents of the insulative film, and the temperature of a holder and the sealing block. Consequently, it is the most important to select appropriate positions of the electrode leads 31 and 32 and the insulative films 41 and 42. In recent years, the thickness of the electrode assembly and thus the thickness of the tabs due to an increase in capacity of the battery have been increased, whereby there is a much greater need for accurate sealing.

The prevent invention has been made in order to solve the above problems, and the present invention has been derived in order to accurately check a defect rate depending on various variables and to acquire the result of sealing based on the positions of the electrode leads 31 and 32 and the insulative films 41 and 42.

Korean Patent Application Publication No. 2016-0118931 (2016.10.12) ("Patent Document 1")

Korean Patent Application Publication No. 2020-0053783 (2020.05.19) ("Patent Document 2")

DISCLOSURE

Technical Problem

The present invention has been made in view of the above problems, and it is an object of the present invention to provide a pouch-shaped battery sealing apparatus capable of accurately adjusting the positions of electrode leads and insulative films of a pouch-shaped battery and checking the degree of sealing based thereon during a process of applying heat and pressure to an outer periphery of a battery case made of a laminate sheet to seal the outer periphery of the battery case when the pouch-shaped battery is manufactured and a pouch-shaped battery sealing method using the same.

Technical Solution

In order to accomplish the above object, the present invention provides a pouch-shaped battery sealing apparatus including a sealing block including a sealing groove corresponding to the thickness and the width of the section of an electrode lead and a position adjustment unit configured to adjust the position of the electrode lead relative to the sealing groove.

The position adjustment unit may include:

1) a first fixing unit configured to fix a pouch-shaped battery case having an electrode assembly including the electrode lead received therein; a first moving unit configured to move the entirety of the first fixing unit; and a first position measurement unit configured to measure displacement due to the first moving unit,
2) a second moving unit configured to position a horizontal partition wall and a vertical partition wall of the electrode lead; a second fixing unit configured to fix a pouch-shaped battery case having an electrode assembly including the electrode lead received therein in the state in which the electrode lead is fitted to the horizontal partition wall and the vertical partition wall of the second moving unit; and a second position measurement unit configured to measure displacement due to the second moving unit, or
3) a third moving unit configured to position a horizontal partition wall and a vertical partition wall of a pouch-shaped battery case having an electrode assembly including the electrode lead received therein; a third fixing unit configured to fix the pouch-shaped battery case having the electrode assembly including the electrode lead received therein in the state in which the pouch-shaped battery case having the electrode assembly including the electrode lead received therein is fitted to the horizontal partition wall and the vertical partition wall of the third moving unit; and a third position measurement unit configured to measure displacement due to the third moving unit.

Each of the first moving unit, the second moving unit, and the third moving unit may include a horizontal moving portion, a vertical moving portion, and a height moving portion configured respectively to perform movement in an x-axis direction, a y-axis direction, and a z-axis direction based on xyz orthogonal coordinates, and each of the first position measurement unit, the second position measurement unit, and the third position measurement unit may include a horizontal measurement portion, a vertical measurement portion, and a height measurement portion configured respectively to measure x-axis, y-axis, and z-axis displacements of the battery case fixing unit. The height may be fixed, whereby the height moving portion and the height measurement portion may be omitted.

Each of the first moving unit, the second moving unit, and the third moving unit may be operated by a control device, or the movement of each of the first moving unit, the second moving unit, and the third moving unit may be adjusted by screw rotation. Each of the first position measurement unit, the second position measurement unit, and the third position measurement unit may be a laser distance measurer or a micrometer.

Each of the first fixing unit, the second fixing unit, and the third fixing unit may include a partition wall configured to support at least one side surface of the pouch-shaped battery case and/or a pressing member configured to fix an upper surface of the pouch-shaped battery case in a lying state by pressing.

The sealing block may include an upper sealing block and a lower sealing block, the sealing groove may be provided in at least one of the upper sealing block and the lower sealing block, and the sealing groove may include a first groove corresponding to the thickness of an insulative film and a second groove corresponding to the thicknesses of the insulative film and the electrode lead.

The position adjustment unit may adjust the position of the electrode lead within a range of the sealing groove.

A delivery unit configured to move the entirety of the position adjustment unit such that a portion to be sealed of the pouch-shaped battery case is disposed between the sealing blocks may be added to the position adjustment unit.

Meanwhile, the present invention provides a pouch-shaped battery sealing method including (S1) disposing a pouch-shaped battery case having an electrode assembly including an electrode lead received therein at the pouch-shaped battery sealing apparatus, (S2) adjusting positions of the electrode lead and an insulative film of the electrode assembly relative to the sealing groove using the position adjustment unit, and (S3) sealing the pouch-shaped battery case.

In step (S2), the positions of the electrode lead and the insulative film relative to the sealing groove in the position adjustment unit may be adjusted. Step (S3) may be performed after the electrode assembly including the electrode lead fixed to the position adjustment unit is moved to the sealing block. The pouch-shaped battery sealing apparatus may further include (S4) checking sealing force of the sealed pouch-shaped battery case after step (S3). In step (S4), the filling length of an adhesive in an empty space when the electrode lead and the insulative film are adhered to each other may be checked. Step (S4) may be performed with the naked eye or using transmission light, such as a laser.

In addition, the present invention may provide all possible combinations of the above solving means.

Advantageous Effects

As is apparent from the above description, the present invention may provide a pouch-shaped battery sealing apparatus capable of accurately adjusting the positions of electrode leads and insulative films of a pouch-shaped battery and checking the degree of sealing based thereon during a process of applying heat and pressure to an outer periphery of a battery case made of a laminate sheet to seal the outer periphery of the battery case when the pouch-shaped battery is manufactured and a pouch-shaped battery sealing method using the same.

In the present invention, it is possible to accurately adjust the positions of the electrode leads and the insulative films through a position adjustment unit while observing the displacement thereof, whereby it is possible to set accurate and uniform sealing positions, and therefore it is possible to provide consistent results.

The position adjustment unit according to the present invention is capable of not only adjusting the positions of the electrode leads but also measuring the degree of sealing depending on the positions of the electrode leads, whereby it is possible to reduce a defect rate in sealing of pouch-shaped batteries.

DESCRIPTION OF DRAWINGS

FIG. 1 is an exploded perspective view of a conventional pouch-shaped battery.

FIG. 2 is a side view of a conventional pouch-shaped battery sealing apparatus.

FIG. 3 is a top view of a position adjustment unit of the conventional pouch-shaped battery sealing apparatus.

FIG. 4 is a top view of a position adjustment unit of a pouch-shaped battery sealing apparatus according to a first embodiment of the present invention.

FIG. 5 is a top view of a position adjustment unit of a pouch-shaped battery sealing apparatus according to a second embodiment of the present invention.

FIG. 6 is a top view of a position adjustment unit of a pouch-shaped battery sealing apparatus according to a third embodiment of the present invention.

FIG. 7 is a schematic view showing that the position adjustment unit (2200) of the pouch-shaped battery sealing apparatus according to the first embodiment of the present invention is moved along rails.

FIG. 8 is a sectional view of a sealing block according to the present invention.

FIG. 9 is a top view of a pouch-shaped battery sealed by the pouch-shaped battery sealing apparatus according to the present invention.

FIG. 10 is a photograph of the pouch-shaped battery sealed by the pouch-shaped battery sealing apparatus according to the present invention.

FIG. 11 is a bias error graph of pouch-shaped batteries moved by the conventional pouch-shaped battery sealing apparatus and the pouch-shaped battery sealing apparatus according to the present invention.

FIG. 12 is a PP filling length error graph of pouch-shaped batteries sealed by the conventional pouch-shaped battery sealing apparatus and the pouch-shaped battery sealing apparatus according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

In the specification of the present application, a sealing block and a delivery unit of a pouch-shaped battery sealing apparatus according to each of first to third embodiments of the present invention are identical to the sealing block 1100 and the delivery unit 1300 of the conventional pouch-shaped battery sealing apparatus 1000, mentioned in the specification of the present application.

FIG. 4 is a top view of a position adjustment unit 2200 of a pouch-shaped battery sealing apparatus 2000 according to a first embodiment of the present invention.

Referring to FIG. 4, the position adjustment unit 2200 of the pouch-shaped battery sealing apparatus 2000 according to the first embodiment includes a first fixing unit 2260 configured to fix a pouch-shaped battery case 10 having an electrode assembly 20 including an electrode lead 31 received therein, a first moving unit 2240 configured to move the entirety of the first fixing unit 2260, and a first position measurement unit 2220 configured to measure displacement due to the first moving unit 2240.

In FIGS. 4 to 6, only one electrode tab 21, insulative film 41, and electrode lead 31 are shown as being provided at one surface of the electrode assembly 20, unlike FIG. 3. This is an example, and another electrode is omitted. Two or more electrode tabs, insulative films, and electrode leads corresponding to a positive electrode and a negative electrode may be disposed at one surface of the electrode assembly 20, or at least one electrode tab, insulative film, and electrode lead may be disposed at each of one surface and the other surface of the electrode assembly. In all cases, it is obvious that the electrode tab, the insulative film, and the electrode lead may be simultaneously sealed or individually sealed; however, it is preferable for the electrode tab, the insulative film, and the electrode lead disposed at one surface of the electrode assembly to be simultaneously sealed.

In general, the positions of the electrode tab, the insulative film, and the electrode lead disposed at the electrode assembly before sealing relative to the electrode assembly are fixed. Consequently, the position of only any one of a plurality of electrode tabs, insulative films, or electrode leads may be adjusted, whereby the position of the other electrode tab, insulative film, or electrode lead relative to a sealing block may be adjusted.

Referring back to FIG. 4, an upper surface of the position adjustment unit 2200 is a flat surface, and the first fixing unit 2260, which has another flat surface, is disposed at the upper surface of the position adjustment unit. The first fixing unit 2260 includes three side walls 2262 and a clamp 2264 configured to fix the pouch-shaped battery case 10 having the electrode assembly 20 including the electrode lead 31 received therein, by which the pouch-shaped battery case 10 is fixed. Pressing holes 2268, which are through-holes, are provided in the position adjustment unit 2200 and the first fixing unit 2260 so as to be pressed by the sealing block 1100 for sealing. The pressing hole 2268 provided in the first fixing unit 2260 is a hole of a fixed size, whereas the size of the through-hole provided in the position adjustment unit 2200 is greater than the size of the pressing hole 2268. Since the position of the first fixing unit 2260 is variable, a through-hole larger than the pressing hole 2268 is necessary in consideration thereof.

FIG. 4 shows only the clamp 2264 configured to fix the electrode lead 31; however, a pressing member (not shown) configured to press the upper surface of the pouch-shaped battery case 10 having the electrode assembly 20 including the electrode lead 31 received therein may be added. The shape and material of the pressing member are not restricted as long as the pressing member is capable of serving to fix the pouch-shaped battery 50. As an example, the pressing member may be constituted by a magnet, and may fix the pouch-shaped battery 50 to the first fixing unit 2260.

The entirety of the first fixing unit 2260 is moved by the first moving unit 2240 in an x-axis direction and a y-axis direction. The first moving unit 2240 includes two movement adjustment screws 2242 and 2244. The two movement adjustment screws 2244 and 2242 may move the first fixing unit 2260 in the x-axis direction and the y-axis direction, respectively. The two movement adjustment screws 2242 and 2244 are provided as one embodiment, and a stepper motor may be used instead.

The movement adjustment screws 2242 and 2244 may be fixed to the position adjustment unit 2200 via fixing shafts (not shown), and may be engaged with screw grooves provided in the first fixing unit 2260 to move the first fixing unit 2260 in the x-axis direction and the y-axis direction through rotation of the screws. The pouch-shaped battery sealing apparatus 2000 according to the present invention may adjust movement in units of 0.01 μm.

The first position measurement unit 2220 configured to measure the displacement of the first moving unit 2240 includes two micrometers 2222 and 2224 configured to measure the x-axis displacement and y-axis displacement of the first moving unit. In FIG. 4, two projecting portions 2266 (only one thereof being shown in FIG. 4) projecting from the first fixing unit 2260 and probes 2226 (only one thereof being shown in FIG. 4) of the two micrometers 2222 and 2224 abut each other, whereby it is possible to measure the displacement of the first fixing unit 2260 due to the first moving unit 2240. FIG. 4 shows the micrometers as an example, and another accurate laser distance measurer may be used instead.

FIG. 4 shows that the first moving unit 2240 is moved only in the x-axis direction and the y-axis direction and that the first position measurement unit 2220 measures the displacement of the first moving unit. In addition, the first moving unit may be moved in the z-axis direction, and the first position measurement unit may measure the displacement of the first moving unit. In general, the upper sealing block 1110 and the lower sealing block 1120 of the sealing block 1100 are symmetrical with each other. In the case in which the pouch-shaped battery case 10 having the electrode assembly 20 including the electrode lead 31 received therein is disposed between the upper sealing block and the lower sealing block, therefore, the portions configured to measure the movement and displacement in the z-axis direction may be omitted.

FIG. 5 is a top view of a position adjustment unit 3200 of a pouch-shaped battery sealing apparatus 3000 according to a second embodiment of the present invention.

Referring to FIG. 5, the position adjustment unit 3200 of the pouch-shaped battery sealing apparatus 3000 according to the second embodiment includes a second moving unit 3240 configured to position a horizontal partition wall 3246 and a vertical partition wall 3248 of the electrode lead 31; a second fixing unit 3260 configured to fix the pouch-shaped battery case 10 having the electrode assembly 20 including the electrode lead 31 received therein in the state in which the electrode lead 31 is fitted to the horizontal partition wall 3246 and the vertical partition wall 3248 of the second moving unit 3240; and a second position measurement unit 3220 configured to measure displacement due to the second moving unit 3240.

Referring to FIG. 5, an upper surface of the position adjustment unit 3200 is a flat surface. The second fixing unit 3260 includes three side walls 3262 and a clamp 3264 configured to fix the pouch-shaped battery case 10 having the electrode assembly 20 including the electrode lead 31 received therein, by which the pouch-shaped battery case 10 is fixed. First, the horizontal partition wall 3246 and the vertical partition wall 3248 of the electrode lead 31 are positioned by the second moving unit 3240, and the electrode lead 31 is fitted thereto. Subsequently, the pouch-shaped battery case 10 having the electrode assembly 20 including the electrode lead 31 received therein is fixed by the second fixing unit 3260. C is an enlarged view of the horizontal partition wall 3246 and the vertical partition wall 3248 moved by the second moving unit 3240.

A pressing hole 3268, which is a through-hole, is provided in the position adjustment unit 3200 so as to be pressed by the sealing block 1100 for sealing hereafter. Since the pouch-shaped battery case 10 having the electrode assembly 20 including the electrode lead 31 received therein is moved in the pressing hole 3268 provided in the position adjustment unit 3200, the size of the pressing hole is set so as to be somewhat large.

FIG. 5 shows only the clamp 3264 configured to fix the electrode lead 31; however, a pressing member (not shown) configured to press the upper surface of the pouch-shaped battery case 10 having the electrode assembly 20 including the electrode lead 31 received therein may be added. The shape and material of the pressing member are not restricted as long as the pressing member is capable of serving to fix the pouch-shaped battery 50. As an example, the pressing member may be constituted by a magnet, and may fix the pouch-shaped battery 50 to the position adjustment unit 3200.

The second moving unit 3240 is moved in the x-axis direction and the y-axis direction. The second moving unit 3240 includes two movement adjustment screws 3242 and 3244. The two movement adjustment screws 3242 and 3244 may move the horizontal partition wall 3246 and the vertical partition wall 3248 in the y-axis direction and the x-axis direction, respectively. The two movement adjustment screws 3242 and 3244 are provided as one embodiment, and a stepper motor may be used instead.

The movement adjustment screws 3242 and 3244 may be fixed to the position adjustment unit 3200 via fixing shafts (not shown), and may be engaged with screw grooves provided in the second moving unit 3240 including the horizontal partition wall 3246 and the vertical partition wall 3248 to move the horizontal partition wall 3246 and the vertical partition wall 3248 in the y-axis direction and the x-axis direction through rotation of the screws. The pouch-shaped battery sealing apparatus 3000 according to the present invention may adjust movement in units of 0.01 μm.

The second position measurement unit 3220 configured to measure the displacement of the second moving unit 3240 includes two micrometers 3222 and 3224 configured to measure the x-axis displacement and y-axis displacement of the second moving unit. In FIG. 5, two projecting portions 3266 (only one thereof being shown in FIG. 5) projecting from the second moving unit 3240 and probes 3226 (only one thereof being shown in FIG. 5) of the two micrometers 3222 and 3224 abut each other, whereby it is possible to measure the displacement of the second moving unit 3240. FIG. 5 shows the micrometers as an example, and another accurate laser measurer may be used instead.

FIG. 5 shows that the second moving unit 3240 is moved only in the x-axis direction and the y-axis direction and that the second position measurement unit 3220 measures the displacement of the second moving unit. In addition, the second moving unit may be moved in the z-axis direction, and the second position measurement unit may measure the displacement of the second moving unit. In general, the upper sealing block 1110 and the lower sealing block 1120 of the sealing block 1100 are symmetrical with each other. In the case in which the pouch-shaped battery case 10 having the electrode assembly 20 including the electrode lead 31 received therein is disposed between the upper sealing block and the lower sealing block, therefore, the portions configured to measure the movement and displacement in the z-axis direction may be omitted.

FIG. 6 is a top view of a position adjustment unit 4200 of a pouch-shaped battery sealing apparatus 4000 according to a third embodiment of the present invention.

Referring to FIG. 6, the position adjustment unit 4200 of the pouch-shaped battery sealing apparatus 4000 according to the third embodiment includes a third moving unit 4240 configured to position a horizontal partition wall 4246 and a vertical partition wall 4248 of the pouch-shaped battery case 10 having the electrode assembly 20 including the electrode lead 31 received therein; a third fixing unit 4260 configured to fix the pouch-shaped battery case 10 having the electrode assembly 20 including the electrode lead 31 received therein in the state in which the pouch-shaped battery case 10 having the electrode assembly 20 including the electrode lead 31 received therein is fitted to the horizontal partition wall 4246 and the vertical partition wall 4248 of the third moving unit 4240; and a third position measurement unit 4220 configured to measure displacement due to the third moving unit 4240.

Referring to FIG. 6, an upper surface of the position adjustment unit 4200 is a flat surface. The third fixing unit 4260 includes a side wall 4262 and a clamp 4264 configured to fix the pouch-shaped battery case 10 having the electrode assembly 20 including the electrode lead 31 received therein, by which the pouch-shaped battery case 10 is fixed. First, the horizontal partition wall 4246 and the vertical partition wall 4248 of the electrode lead 31 are positioned by the third moving unit 4240, and the battery case 10 is fitted thereto. Subsequently, the pouch-shaped battery case 10 having the electrode assembly 20 including the electrode lead 31 received therein is fixed by the third fixing unit 4260.

A pressing hole 4268, which is a through-hole, is provided in the position adjustment unit 4200 so as to be pressed by the sealing block 1100 for sealing hereafter. Since the pouch-shaped battery case 10 having the electrode assembly 20 including the electrode lead 31 received therein is moved in the pressing hole 4268 provided in the position adjustment unit 4200, the size of the pressing hole is set so as to be somewhat large.

FIG. 6 shows only the clamp 4264 configured to fix the electrode lead 31; however, a pressing member (not shown) configured to press the upper surface of the pouch-shaped battery case 10 having the electrode assembly 20 including the electrode lead 31 received therein may be added. The shape and material of the pressing member are not restricted as long as the pressing member is capable of serving to fix the pouch-shaped battery 50. As an example, the pressing member may be constituted by a magnet, and may fix the pouch-shaped battery 50 to the position adjustment unit 4200.

The third moving unit 4240 is moved in the x-axis direction and the y-axis direction. The third moving unit 4240 includes two movement adjustment screws 4242 and 4244. The two movement adjustment screws 4242 and 4244 may move the horizontal partition wall 4246 and the vertical partition wall 4248 in the y-axis direction and the x-axis direction, respectively. The two movement adjustment screws 4242 and 4244 are provided as one embodiment, and a stepper motor may be used instead.

The movement adjustment screws 4242 and 4244 may be fixed to the position adjustment unit 4200 via fixing shafts (not shown), and may be engaged with screw grooves provided in the third moving unit 4240 including the horizontal partition wall 4246 and the vertical partition wall 4248 to move the horizontal partition wall 4246 and the vertical partition wall 4248 in the y-axis direction and the x-axis direction through rotation of the screws. The pouch-shaped battery sealing apparatus 4000 according to the present invention may adjust movement in units of 0.01 μm.

The third position measurement unit 4220 configured to measure the displacement of the third moving unit 4240 includes two micrometers 4222 and 4224 configured to measure the x-axis displacement and y-axis displacement of the third moving unit. In FIG. 6, two projecting portions 4266 (only one thereof being shown in FIG. 6) projecting from the third moving unit 4240 and probes 4226 (only one thereof being shown in FIG. 6) of the two micrometers 4222 and 4224 abut each other, whereby it is possible to measure the displacement of the third moving unit 4240. FIG. 6 shows the micrometers as an example, and another accurate laser measurer may be used instead.

FIG. 6 shows that the third moving unit 4240 is moved only in the x-axis direction and the y-axis direction and that the third position measurement unit 4220 measures the displacement of the third moving unit. In addition, the third moving unit may be moved in the z-axis direction, and the third position measurement unit may measure the displacement of the third moving unit. In general, the upper sealing block 1110 and the lower sealing block 1120 of the sealing block 1100 are symmetrical with each other. In the case in which the pouch-shaped battery case 10 having the electrode assembly 20 including the electrode lead 31 received therein is disposed between the upper sealing block and the lower sealing block, therefore, the portions configured to measure the movement and displacement in the z-axis direction may be omitted.

The position adjustment unit 2200, 3200, or 4200 according to the present invention may be located under the sealing block 1100, or the position adjustment unit 2200, 3200, or 4200 may be disposed at a separate place to move the sealing block 1100.

In the pouch-shaped battery sealing apparatus 2000, 3000, or 4000 according to the present invention, a delivery unit 1300 configured to dispose the entirety of the position adjustment unit 2200, 3200, or 4200 at the sealing block 1100 is added in order to locate the position adjustment unit 2200, 3200, or 4200 under the sealing block 1100.

The delivery unit 1300 may be configured such that rails are disposed at opposite side surfaces of the position adjustment unit 2200, 3200, or 4200 and wheels configured to move the position adjustment unit 2200, 3200, or 4200 are located at the rails in order to move the position adjustment unit 2200, 3200, or 4200 in a desired direction.

FIG. 7 is a schematic view showing that the position adjustment unit 2200 of the pouch-shaped battery sealing apparatus according to the first embodiment of the present invention is moved along the rails. a) of FIG. 7, which is located on a left side, and b) of FIG. 7, which is located on a right side, show the position adjustment unit before and after movement thereof, respectively.

FIG. 8 is a sectional view of the sealing block 1100 according to the present invention, and FIG. 9 is a top view of a pouch-shaped battery sealed by the pouch-shaped battery sealing apparatus according to the present invention.

As shown in FIG. 8, the sealing block 1100 according to the present invention includes an upper sealing block 1110 and a lower sealing block 1120, and a sealing groove is provided in at least one of the upper sealing block 1110 and the lower sealing block 1120.

The upper sealing block 1110 and the lower sealing block 1120 may be symmetrical with each other. The sealing groove may be provided in a plane at which the upper sealing block 1110 and the lower sealing block 1120 abut each other. The sealing groove is formed in the upper sealing block 1110 and the lower sealing block 1120 in a symmetrical fashion to provide a predetermined space. As shown in FIG. 8, the sealing groove may include first grooves 1114 and 1124 corresponding to the thickness of the insulative film 41/42 and second grooves 1112 and 1122 corresponding to the thicknesses of the insulative film 41/42 and the electrode lead 31/32. At this time, tapered inclined surfaces may be added between the first grooves 1114 and 1124 and the plane and between the first grooves 1114 and 1124 and the second grooves 1112 and 1122.

The position adjustment unit 2200, 3200, or 4200 may adjust the positions of the electrode lead 31/32 and the insulative film 41/42 within a range A of the first grooves and a range B of the second grooves of the sealing block 1100.

In another embodiment, the groove may be formed only in the upper sealing block or the lower sealing block of the sealing block 1100.

As can be seen from FIGS. 8 and 9, a sealed portion S sealed by the sealing block 1100 may be located at the battery case 10 of the pouch-shaped battery 50, i.e. a portion to be sealed of the battery case 10, the range A of the first grooves may be disposed so as to be located at the insulative films 41 and 42, and the range B of the second grooves may be disposed so as to be located at the electrode leads 31 and 32.

Depending on circumstances, in order to check sealing force of the pouch-shaped battery 50, the range A of the first grooves and the range B of the second grooves may be disposed so as to be partially biased. At this time, the sealing force of the pouch-shaped battery 50 may be checked through a range corresponding to the tapered inclined surfaces between the first grooves 1114 and 1124 and the second grooves 1112 and 1122, i.e. a sealing force checking portion G.

The sealing force is checked by measuring the filling length of an adhesive between the electrode leads 31 and 32 and the insulative films 41 and 42 corresponding to the sealing force checking portion G. The filling length of the adhesive may be checked with the naked eye or using a laser.

FIG. 10 is a photograph of the pouch-shaped battery sealed by the pouch-shaped battery sealing apparatus according to the present invention. When the electrode lead 31 is set so as to be biased, it is possible to easily check the filling length of the adhesive.

FIG. 11 is a bias error graph of pouch-shaped batteries moved by the conventional pouch-shaped battery sealing apparatus and the pouch-shaped battery sealing apparatus according to the present invention, and FIG. 12 is a PP filling length error graph of pouch-shaped batteries sealed by the conventional pouch-shaped battery sealing apparatus and the pouch-shaped battery sealing apparatus according to the present invention. When the pouch-shaped battery sealing apparatus according to the present invention is used, position setting may be accurately performed, and therefore it can be seen that biasing in filling length is reduced.

A pouch-shaped battery sealing method according to the present invention includes (S1) a step of disposing a pouch-shaped battery case 10 having an electrode assembly 20 including electrode leads 31 and 32 received therein at the pouch-shaped battery sealing apparatus 2000, 3000, or 4000, (S2) a step of adjusting the positions of the electrode leads 31 and 32 and insulative films 41 and 42 of the electrode assembly 20 relative to the sealing grooves using the position adjustment unit 2200, 3200, or 4200, and (S3) a step of sealing the pouch-shaped battery case 10.

Step (S1) includes fixing the pouch-shaped battery case 10 having the electrode assembly 20 including the electrode leads 31 and 32 received therein to the position adjustment unit 2200, 3200, or 4200. The pouch-shaped battery 50 may be a battery after the electrode assembly 20 is received and fixed in the pouch-shaped battery case 10.

In step (S2), the positions of the electrode leads 31 and 32 relative to the sealing grooves in the position adjustment unit 2200, 3200, or 4200 may be adjusted. The value at which the electrode leads 31 and 32 are aligned with centers of the first grooves 1114 and 1124 and the second grooves 1112 and 1122 may be set to an initial value of 0, the pouch-shaped battery 50 may be moved according to the initial value, or setting may be performed so as to deviate from the initial value to some extent for experimentation. That is, in step (S2), the electrode leads 31 and 32 may be disposed in the state in which the positions of the electrode leads relative to the sealing grooves are adjusted so as to deviate from the centers thereof in order to check the sealing force.

Step (S3) may be performed after the electrode assembly 20 including the electrode leads 31 and 32 fixed to the position adjustment unit 2200, 3200, or 4200 is moved to the sealing block 1100.

The pouch-shaped battery 50 may be moved into the sealing block 1100, and then the pouch-shaped battery may be sealed. The sealing block 1100 may be constituted by an upper sealing block 1110 and a lower sealing block 1120, and a pressing hole 2268, 3268, or 4268, which is a space for sealing by the sealing blocks 1110 and 1120, may be provided in the position adjustment unit 2200, 3200, or 4200.

To this end, the position adjustment unit 2200, 3200, or 4200 may be constituted by a portion configured to fix a main body of the pouch-shaped battery case and a portion configured to fix the electrode leads.

(S4) A step of checking the sealing force of the sealed pouch-shaped battery case may be further included after step (S3). This may be used to check a pressing error range depending on the material or shape of the pouch-shaped battery, the material of an adhesive, or the material or shape of the sealing block.

In step (S4), the filling length of the adhesive in an empty space when the electrode leads and the insulative films are adhered to each other may be checked, whereby the sealing force may be checked.

At this time, the sealing force may be checked with the naked eye or using transmission light, such as a laser.

Those skilled in the art to which the present invention pertains will appreciate that various applications and modifications are possible within the category of the present invention based on the above description.

DESCRIPTION OF REFERENCE SYMBOLS

- 10: Battery case
- 11: Lower part
- 12: Upper part
- 13: Receiving portion
- 20: Electrode assembly
- 21, 22: Electrode tabs
- 31, 32: Electrode leads
- 41, 42: Insulative films
- 50: Pouch-shaped battery
- 1000, 2000, 3000, 4000: Pouch-shaped battery sealing apparatuses
- 1100: Sealing block
- 1110: Upper sealing block
- 1112, 1122: Second grooves
- 1114, 1124: First grooves
- 1120: Lower sealing block
- 1200, 2200, 3200, 4200: Position adjustment units
- 1220, 2220, 3220, 4220: Position measurement units
- 2222, 2224, 3222, 3224, 4222, 4224: Micrometers
- 2226, 3226, 4226: Probes
- 1222, 1224: Rulers
- 2240, 3240, 4240: Moving units
- 2242, 2244, 3242, 3244, 4242, 4244: Movement adjustment screws
- 3246, 4246: Horizontal partition walls
- 3248, 4248: Vertical partition walls
- 1260, 2260, 3260, 4260: Fixing units
- 1262, 1264, 2262, 3262, 4262: Side walls
- 1266: Pressing member
- 2264, 3264, 4264: Clamps
- 2266, 3266, 4266: Projecting portions
- 2268, 3268, 4268: Pressing holes
- 1300: Delivery unit
- 1400: Base
- A: Range of first groove
- B: Range of second groove
- C: Enlarged portion
- G: Sealing force checking portion
- S: Sealed portion

INDUSTRIAL APPLICABILITY

The present invention relates to a pouch-shaped battery sealing apparatus including a position adjustment unit capable of adjusting relative positions of an electrode lead and an insulative film before sealing during a process of applying heat and pressure to an outer periphery of a battery case made of a laminate sheet to seal the outer periphery of the battery case when a pouch-shaped battery is manufactured and a pouch-shaped battery sealing method using the same, and therefore the present invention has industrial applicability.

The invention claimed is:

1. A pouch-shaped battery sealing apparatus comprising:

a sealing block comprising a sealing groove having a shape that is complimentary to a shape of a section of an electrode lead; and a position adjustment unit configured to adjust a position of the electrode lead relative to the sealing groove, the position adjustment unit including a fixing unit configured to fix a pouch-shaped battery case having an electrode assembly comprising the electrode lead received therein and first, second, and third moving units, wherein the first moving unit, the second moving unit, and the third moving unit have horizontal moving portion, a vertical moving portion, and a height moving portion configured to respectively move the electrode lead relative to the sealing groove in an x-axis direction, a y-axis direction, and a z-axis direction based on xyz orthogonal coordinates, wherein the sealing apparatus is configured so that movement of each of the first moving unit, the second moving unit, and the third moving unit is adjusted by screw rotation, and wherein the position adjustment unit comprises first, second, and third position measurement units that include a horizontal measurement portion, a vertical measurement portion, and a height measurement portion configured respectively to measure x-axis, y-axis, and z-axis displacements of the fixing unit.

2. The pouch-shaped battery sealing apparatus according to claim 1, wherein the a position measurement unit is configured to measure a displacement of the moving unit.

3. The pouch-shaped battery sealing apparatus according to claim 2, wherein the position measurement unit comprises a horizontal measurement portion and a vertical measurement portion configured respectively to measure the x-axis and the y-axis displacements of the fixing unit.

4. The pouch-shaped battery sealing apparatus according to claim 3, wherein the position measurement unit further comprises a height measurement portion configured to measure the z-axis displacement of the fixing unit.

5. The pouch-shaped battery sealing apparatus according to claim 2, wherein the moving unit is configured to be operated by a control device, or movement of the moving unit is configured to adjusted by rotation of a screw.

6. The pouch-shaped battery sealing apparatus according to claim 2, wherein the position measurement unit is a laser distance measurer or a micrometer.

7. The pouch-shaped battery sealing apparatus according to claim 2, wherein the fixing unit comprises:

a partition wall configured to support at least one side surface of the pouch-shaped battery case; and/or a pressing member configured to fix an upper surface of the pouch-shaped battery case in a lying state by pressing.

8. The pouch-shaped battery sealing apparatus according to claim 1, wherein the sealing block comprises an upper sealing block and a lower sealing block, the sealing groove extends into at least one of the upper sealing block or the lower sealing block, and the sealing groove comprises a first groove configured to accommodate therein a thickness of an insulative film and a second groove configured to accommodate therein the thicknesses of the insulative film and a thickness of the electrode lead.

9. The pouch-shaped battery sealing apparatus according to claim 1, wherein the position adjustment unit is configured to adjust the position of the electrode lead within the sealing groove.

10. The pouch-shaped battery sealing apparatus according to claim 2, further comprising a delivery unit configured to move an entirety of the position adjustment unit such that a portion to be sealed of the pouch-shaped battery case is disposed within the sealing block.

11. A pouch-shaped battery sealing method comprising:

disposing a pouch-shaped battery case having an electrode assembly comprising an electrode lead received therein on the pouch-shaped battery sealing apparatus according to claim 1;

adjusting positions of the electrode lead and an insulative film of the electrode assembly relative to the sealing groove using the position adjustment unit; and sealing the pouch-shaped battery case.

12. The pouch-shaped battery sealing method according to claim 11, wherein, during the adjusting, the electrode lead and the insulative film are disposed in the position adjustment unit.

13. The pouch-shaped battery sealing method according to claim 11, wherein the sealing is performed after the electrode assembly is moved to the sealing block.

14. The pouch-shaped battery sealing method according to claim 11, further comprising, after the sealing, checking a sealing force of the sealed pouch-shaped battery case.

15. The pouch-shaped battery sealing method according to claim 14, wherein, during the checking, a filling length of an adhesive in an empty space when the electrode lead and the insulative film are adhered to each other is checked.

16. The pouch-shaped battery sealing method according to claim 15, wherein the checking is performed using a transmission light.

17. The pouch-shaped battery sealing apparatus according to claim 2, wherein the moving unit is configured to position a horizontal partition wall and a vertical partition wall of the electrode lead, and the fixing unit is configured to fit the electrode lead to a horizontal partition wall and a vertical partition wall of the moving unit.

18. The pouch-shaped battery sealing apparatus according to claim 2, wherein the moving unit is configured to position a horizontal partition wall and a vertical partition wall of the pouch-shaped battery case, and the fixing unit is configured to fit the pouch-shaped battery case to a horizontal partition wall and a vertical partition wall of the moving unit.

* * * * *